Figure 1:
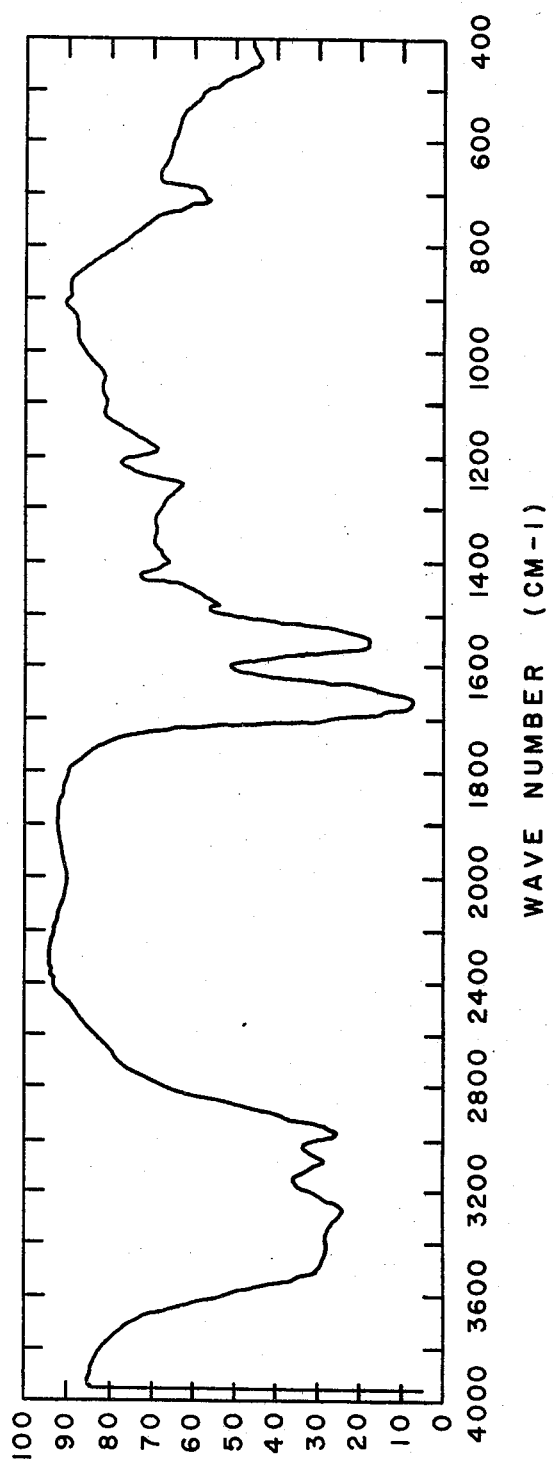

United States Patent [19]

Kawaguchi et al.

[11] 3,880,994

[45] Apr. 29, 1975

[54] ANTIBIOTIC BU-1880

[75] Inventors: Hiroshi Kawaguchi; Hiroshi Tsukiura, both of Tokyo; Kei-ichi Fujisawa, Kamifukuoka; Kei-ichi Numata, Tokyo, all of Japan

[73] Assignee: Bristol-Myers Company, New York, N.Y.

[22] Filed: Dec. 6, 1972

[21] Appl. No.: 312,451

[52] U.S. Cl. ............................ 424/119; 195/80 R
[51] Int. Cl. .................................... H61k 21/00
[58] Field of Search ................. 424/119; 195/80

[56] References Cited
OTHER PUBLICATIONS

Miller, The Pfizer Handbook of Microbial Metabolites, McGraw–Hill Book Co., Inc., N.Y., N.Y., 1961, pp. 371 & 372.

*Primary Examiner*—Jerome D. Goldberg
*Attorney, Agent, or Firm*—Robert E. Havranek

[57] ABSTRACT

Antibiotic Bu-1880 is a basic peptide of unknown structure which is fermented from a strain of *Bacillus circulans*, herein designated B255-B6 and deposited in the American Type Culture Collection as A.T.C.C. No. 21828.

2 Claims, 1 Drawing Figure

INFRA RED ABSORPTION SPECTRUM OF Bu 1880

ANTIBIOTIC BU-1880

BACKGROUND OF THE INVENTION

1. Field of the Invention:

The antibiotic Bu-1880 is a new and novel basic peptide of unknown structure.

2. Description of the Prior Art:

A. Suzuki, T.; H. Inouye, K. Fujikawa and Y. Suketa: Studies on the chemical structure of colistin. I. Fractionation, molecular weight determination, amino acid and fatty acid composition. J. Biochem. 54: 25-33 (1963).

B. Stansly, P. G.; R. G. Shepard and H. J. White: Polymyxin, a new chemotherapeutic agent. Bull. Johns Hopkins Hospital 81: 43 (1947).

C. Murray, F. J.; P. A. Tetrault, O. W. Kaufmann, H. Koffler, D. H. Peterson and D. R. Collingsworth: Circulin, an antibiotic from an organism resembling *Bacillus circulans*. J. Bacteriol. 57: 305 (1949).

D. Vogler, K. and P. O. Studer: The chemistry of the polymyxin antibiotics. Experientia 22: 345–416 (1966).

SUMMARY OF THE INVENTION

Antibiotic Bu-1880, a basic peptide of unknown structure, is fermented from a strain of *Bacillus circulans* designated herein as B255-B6 and deposited in the American Type Culture Collection as A.T.C.C. No. 21828. Chemically the antibiotic is known to contain phenylalanine, leucine and $\alpha$, $\gamma$-diaminobutyric acid in an approximate molar ratio of about 1:2:5 and 3-hydroxy-8-methyldecanoic acid. The antibiotic is active against gram-positive and gram-negative bacteria both in vitro and in vivo.

COMPLETE DISCLOSURE

This invention relates to a new and novel antibiotic called Bu-1880. The basic peptide antibiotic has been isolated from the fermentation broth of a new strain of *Bacillus circulans*, herein designated B255-B6, which was isolated from a soil sample collected in Indore, India. The producing organism elaborated several active components in the broth, among which the major and the most active component was isolated first, characterized and designated as Bu-1880. Bu-1880 is a basic peptide antibiotic and extractable into n-butanol from the fermentation broth. Chemically, it contains phenylalanine, leucine and $\alpha$, $\gamma$-diaminobutyric acid with an approximate molar ratio of 1:2:5, along with 3-hydroxy-8-methyldecanoic acid which is a novel fatty acid moiety never before found as a constituent of an antibiotic. Antibiotic Bu-1880 is active against gram-positive and gram-negative bacteria both in vitro and in vivo. Compared with the bacterial peptide antibiotic colistin, Bu-1880 is more active than colistin against gram-positive bacteria but less active against gram-negative organisms. Bu-1880 is several times less toxic than colistin in terms of the acute $LD_{50}$.

The Bu-1880-producing organism, designated strain No. B255-B6 in the Bristol-Banyu culture collection, appears to belong to Genus Bacillus and has the characteristics described below:

Morphology

Vegetative cell: Rod, 0.5 to 0.7 by 2.5 to 6.0 microns. Motile. Gram-variable, generally negative.

Spores: Oval to ellipsoidal, 0.8 to 1.0 by 1.2 to 1.5 microns. Central to terminal. Spore wall thick. Sporangia definitely swollen.

Cultural characteristics

1. Nutrient broth: Pellicle and surface ring formed. Turbid. Pellicle and sediment viscous.

2. Glucose broth: pH 5.4. Very viscous sediment formed.

3. Colony on nutrient agar: Opaque, convex, entire, later crenated edge, smooth, later becoming wrinkled, viscous. Mediate size, 2 to 5 mm. in diameter. No or scant motile micro-colony.

4. Gelatin-stab: Pellicle and surface ring growth.

5. Milk: pH invariable. Viscous surface ring growth. Viscous.

6. Growth-temperature: Abundant growth at 28° C. and 42° C. Restricted growth at 20° C. and 45° C. No growth at 15° C. and 52° C. No growth at pH 6.0, 50° C.

7. Oxygen demand: Aerobic.

8. NaCl broth: Abundant growth at 2%-NaCl. Restricted growth at 3 percent-NaCl. No growth at 4%-NaCl.

9. Growth factor: None.

Physiological characteristics

| | | |
|---|---|---|
| 1. | Gas production from sugars: | Negative |
| 2. | Starch hydrolysis: | Positive |
| 3. | Acetylmethylcarbinol: | Negative |
| 4. | Indole: | Negative |
| 5. | Liquefaction of gelatin: | Positive |
| 6. | Milk: | Coagulated without peptonization |
| 7. | Reduction of nitrate to nitrite: | Positive |
| 8. | Utilization of citrate: | Negative |
| 9. | Utilization of ammonium-salts: | Positive |
| 10. | Catalase: | Positive |
| 11. | Urease: | Negative |

12. Acid production from carbohydrates (with ammonium salt as sole nitrogen source): Glycerol +, L-Arabinose −, D-Xylose +, Rhamnose −, D-Fructose +, D-Galactose +, D-Glucose +, D-Mannose +, Sucrose +, Lactose +, Maltose +, Raffinose −~±, Inositol +, D-Mannitol +, D-Sorbitol +, Dulcitol −, Starch +, Cellulose −, Inuline +, Salicine +.

In view of the morphological, cultural and physiological characteristics described above, strain B255-B6 was concluded to be classified to a species of *Bacillus circulans*. The determinative characteristics of strain B255-B6 for this taxonomic identification are summarized below.

| | | |
|---|---|---|
| 1. | Cell: | Rod, Gram-variable, mostly negative. |
| 2. | Spores: | Oval to ellipsoidal. |
| 3. | Sporangia: | Definitely swollen. |
| 4. | No growth under anaerobic conditions. | |
| 5. | Catalase: | Positive. |
| 6. | No gas formation from carbohydrate. | |
| 7. | Starch: | hydrolyzed. |
| 8. | Acetylmethylcarbionol: | Not produced. |
| 9. | Indole: | Not produced. |
| 10. | No growth at 52° C. | |
| 11. | No growth in 4%-NaCl broth. | |

A culture of the living organism has been deposited in the American Type Culture Collection, 12301 Parklawn Drive, Rockville, Maryland 20852 and has been assigned the following name and catalog number:

*Bacillus circulans* (Strain No. B255-B6) A.T.C.C. No. 21828.

Antibiotic Production

*Bacillus circulans* strain B255-B6 grows well at 28-42° C. on agar slant. The well-sporulated agar slant was used to inoculate the germination medium having the following composition: 7.5 percent soybean meal, 2.0 percent corn starch, 0.33% $MgSO_4 \cdot 7\ H_2O$ and 1.0% $CaCO_3$. The seed culture was incubated at 28°C. for 2 days on a rotary shaker (250 rpm), and 2 ml. of the growth was transferred to 100 ml. of the fermentation medium (same composition as the seed medium) in a 500-ml. Erlenmeyer flask.

The progress of the fermentation was followed by the paper disc-agar plate assay using *Bacillus subtilis* PCI 219 as the test organism. In one of the shaking flask experiments, the antibiotic production was 250 mcg./ml. on the second day (pH 8.0) and reached the maximum of 1000 mcg./ml. on the third day (pH 8.5). The pilot tank fermentations gave a peak potency of 100-200 mcg./ml.

Isolation and Purification

The fermentation broth (ca. 300L, 100 mcg./ml.) was extracted at pH 8 with about one-half volume of n-butanol (150L). The extract was washed with water, concentrated in vacuo and then stirred with 5L of N/5 HCl to transfer the activity. The aqueous acidic extract was again backextracted at pH 8 with 10L of n-butanol. The solvent extract was evaporated in vacuo to a small volume and the concentrate was added with 10 volumes of ethyl acetate-acetone mixture (2:1) to precipitate inactive impurities. The mother liquor was evaporated in vacuo to give about 60 g. of crude Bu-1880 as a yellowish brown solid.

A part of the solid (20 g.) was purified by silica gel chromatography using a column of silica gel (Wakogel C-200, 3.5 cm. diameter × 70 cm.) which was developed by ethanol—14 percent ammonia (4:1) solution collecting 10-ml. fractions. Tube Nos. 286 through 470 were combined, concentrated in vacuo and then lyophilized to give 3.4 g. of white powder. A trace amount of impurity in the solid was eliminated by repeating the silica gel chromatography.

Physico-chemical Properties

Bu-1880 is a white amorphous solid with basic nature (pKa' 8.83 in aqueous ethanol) and melts at 239°–242° C. with decomposition. The specific rotation is: $[\alpha]_D^{24} = -18°$ (c. 1.0, N/10 HCl). It has only end absorption in UV (ultraviolet) regions and shows a peptide-type IR (infrared) spectrum (FIG. 1). The NMR (nuclear magnetic resonance) spectrum indicates a presence of aromatic protons at $\delta 7.14$ ppm. Analytical data are: C, 56.34; H, 8.51; N, 15.92; no halogen, no sulfur. It gives positive reactions with ninhydrin and Ehrlich reagents, and decolorized permanganate. The Sakaguchi reaction is negative.

The molecular weight was determined by the ultracentrifugation technique and was determined to be in the range of about 1050±50. This would appear to support a structure comprised of one part phenylalanine, two parts leucine, five parts $\alpha, \gamma$-diaminobutyric acid and one part 3-hydroxy-8-methyldecanoic acid as a monomer. The theoretical molecular weight for this molecule would be 1058.36.

Bu-1880 is soluble in acidic water, aqueous ethanol, aqueous butanol and aqueous dioxane, slightly soluble in distilled water, methanol, ethanol and n-butanol, and practically insoluble in alkaline water, acetone and ethyl acetate. The hydrochloride salt is soluble in water and aqueous methanol.

The paper and thin-layer chromatographic data are as follows:

| Paper Chromatography System (ascending) | RF |
|---|---|
| n-butanol saturated with water | 0.35 |
| aqueous 3% $NH_4Cl$ | 0.70 |
| acetone-water (1:1) | 0.00 |
| n-butanol-methanol-water (4:1:2) | 0.60 |
| above + 1.5% methyl orange | 0.75 |
| benzene-methanol (4:1) | 0.00 |
| water | 0.00 |

| TLC plate | TLC (Thin Layer Chromatography) System | RF |
|---|---|---|
| silica gel | n-propanol-17% aqueous $NH_4OH$ | 0.10 |
| do. | n-butanol-acetic acid water (3:1:1) | 0.40 |
| do. | n-propanol-pyridine-acetic acid-water (15:10:3:2) | 0.70 |
| do. | chloroform-pyridine-28% $NH_4OH$-water (1:4:2:1) | 0.85 |
| cellulose | n-butanol-ethanol-acetic acid-water (25:25:3:47) | 0.85 |

Bu-1880 was hydrolyzed with 6N HCl in a sealed tube for 16 hours. The amino acid analysis of the hydrolysate indicated three amino acids, phenylalanine, leucine and $\alpha, \gamma$-diaminobutyric acid with an approximate molar ratio of 1:2:5. Extraction of the hydrolysate with ether afforded an acidic substance which was identified with 3-hydroxy-8-methyldecanoic acid.

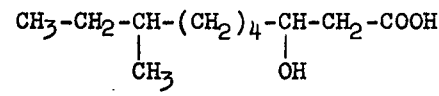

Biological Activities

Antibiotic preparations used in this section were the hydrochloride salt of Bu-1880 and colistin sulfate. The latter was a commercial product supplied by Banyu Pharmaceutical Company Ltd., containing colistins A and B in an approximate ratio of 3:1.

Antibacterial spectrum

The minimum inhibitory concentrations (MIC) of Bu-1880 against a wide variety of bacteria were determined by the serial agar dilution method on nutrient agar plates of pH 7.0. The results are shown in Table 1 along with those of colistin which was used as a reference antibiotic. Bu-1880 inhibits growth of both gram-positive and gram-negative bacteria including *Pseudomonas* species. When compared with colistin, Bu-1880 is less active than colistin against gram-negative bacteria but more active against staphylococci and other gram-positive bacilli. *Serratia marcescens* and *Proteus* species are mostly resistant to the both antibiotics.

Table I

Antibacterial Spectra of Bu-1880

| Test Organisms | | | MIC (mcg./ml.) | |
|---|---|---|---|---|
| | | | Bu-1800 | Colistin |
| Escherichia | coli | NIHJ | 3.1 | 0.4 |
| do. | do. | Juhl | 3.1 | 0.4 |
| do. | do. | A20363 | 3.1 | 0.4 |
| do. | do. | K12 | 3.1 | 0.4 |
| Klebsiella | pneumoniae | D11 | 3.1 | 0.4 |
| do. | do. | A9678 | 3.1 | 0.8 |
| do. | do. | A9977 | 3.1 | 0.4 |
| do. | do. | A20680 | 12.5 | 12.5 |
| Pseudomonas | aeruginosa | D15 | 6.3 | 3.1 |
| do. | do. | A9923 | 12.5 | 6.3 |
| do. | do. | A9930 | 3.1 | 0.8 |
| do. | do. | D113 | 12.5 | 6.3 |
| do. | do. | Yale | 6.3 | 1.6 |
| do. | multophilia | A20620 | 3.1 | 3.1 |
| do. | sp. | A20355 | 6.3 | 1.6 |
| do. | do. | A20358 | 12.5 | 3.1 |
| do. | do. | A20368 | 100 | >100 |
| Serratia | marcescens | A20019 | >100 | >100 |
| do. | do. | A20335 | >100 | >100 |
| do. | do. | A20442 | >100 | >100 |
| Salmonella | enteritidis | A9351 | 3.1 | 0.8 |
| do. | typhosa | Yale | 3.1 | 0.8 |
| do. | do. | NIHJ | 3.1 | 0.4 |
| do. | paratyphi | A | 3.1 | 0.4 |
| Shigella | flexneri | A9634 | 3.1 | 0.4 |
| do. | dysenteriae | | 3.1 | 0.4 |
| Shigella | sonnei | Yale | 3.1 | 0.4 |
| Proteus | vulgaris | A9436 | >100 | >100 |
| do. | do. | A9699 | 6.3 | 12.5 |
| do. | do. | ATCC9920 | >100 | >100 |
| do. | morganii | A9553 | >100 | >100 |
| do. | do. | A20455 | >100 | >100 |
| do. | do. | A9900 | 6.3 | >100 |
| do. | do. | A20454 | >100 | >100 |
| Staphylococcus | aureus | Smith | 6.3 | 50 |
| do. | do. | No.193 | 6.3 | 50 |
| do. | do. | BX-1633 | 6.3 | 25 |
| do. | do. | Terajima | 3.1 | 12.5 |
| do. | do. | Russell | 6.3 | 50 |
| Sarcina | lutea | PCI 1001 | 12.5 | 50 |
| Micrococcus | flavus | | 3.1 | 6.3 |
| Bacillus | mycoides | | 25 | >100 |
| do. | cereus | ATCC10702 | 6.3 | >100 |
| do. | anthracis | No.115 | 6.3 | >100 |

Effect of Media pH

The effect of media pH on the in vitro activity of Bu-1880 was tested by the tube dilution method in Nutrient Broth, the pH being adjusted 6.0, 7.0 and 8.0. MIC's were determined against E. coli, Ps. aeruginosa, S. aureus and B. subtilis. Again, colistin was used as a reference. As shown in Table 2, the MIC against S. aureus was significantly influenced by the media pH, being greater at lower pH.

Effect of inoculum size

The effect of inoculum size of test organisms on the MIC of Bu-1880 was tested in Nutrient Broth at pH 7.0, the organisms being inoculated at $10^6$, $10^4$ and $10^2$ cell/ml. of the medium. As shown in Table 3, increase of the inoculum size resulted in greated MIC value of Bu-1880 in a like fashion as with colistin.

Table 2

Effect of Media pH on MIC (mcg./ml.)

| Test Organism | Bu-1880 | | | Colistin | | |
|---|---|---|---|---|---|---|
| | pH 6 | pH 7 | pH 8 | pH 6 | pH 7 | pH 8 |
| E. coli NIHJ | 6.3 | 3.1 | 3.1 | 0.8 | 0.8 | 0.2 |
| Ps. aeruginosa D15 | 3.1 | 3.1 | 3.1 | 3.1 | 3.1 | 1.6 |
| S. aureus Smith | 25 | 6.3 | 3.1 | >100 | 100 | 12.5 |
| B. subtilis PCI | 1.6 | 1.6 | 0.4 | 25 | 3.1 | 0.2 |

Table 3

Effect of Inoculum Size (cell./ml.) on MIC (mcg./ml.)

| Test Organism | Bu-1880 | | | Colistin | | |
|---|---|---|---|---|---|---|
| | $10^6$ | $10^4$ | $10^2$ | $10^6$ | $10^4$ | $10^2$ |
| E. coli NIHJ | 25 | 3.1 | 3.1 | 1.6 | 0.4 | 0.2 |
| Ps. aeruginosa D15 | 12.5 | 3.1 | 1.6 | 12.5 | 1.6 | 0.4 |
| S. aureus Smith | 6.3 | 3.1 | 1.6 | 50 | 12.5 | 6.3 |
| B. subtilis PCI 219 | 1.6 | 0.8 | 0.2 | 3.1 | 0.8 | 0.2 |

Effect of serum

Increasing concentrations of human serum were added to Nutrient Broth to give final serum concentrations of 25 percent, 50 percent and 75 percent. The MIC's were determined against four test organisms and colistin was used as a reference. The results are shown in Table 4.

Bu-1880 is valuable as an antibacterial agent, nutritional supplement in animal feeds, therapeutic agent in poultry and animals, including man, and is especially valuable in the treatment of infectious diseases caused by Gram-positive and Gram-negative bacteria.

When administered orally, Bu-1880 is useful as an adjunctive treatment for preoperative sterilization of Table 4

| Test Organism | Effect of Serum on MIC (mcg./ml.) | | | | | | | |
|---|---|---|---|---|---|---|---|---|
| | Bu-1880 | | | | Colistin | | | |
| | 0% | 25% | 50% | 75% | 0% | 25% | 50% | 75% |
| E. coli NIHJ | 3.1 | 3.1 | 3.1 | 3.1 | 0.2 | 0.4 | 0.4 | 0.8 |
| Ps. aeruginosa D15 | 3.1 | 6.3 | 6.3 | 12.5 | 1.6 | 1.6 | 1.6 | 1.6 |
| S. aureus Smith | 3.1 | 3.1 | 6.3 | 12.5 | 12.5 | 12.5 | 25 | 25 |
| B. subtilis PCI 219 | 0.4 | 0.4 | 0.4 | 1.6 | 0.2 | 0.2 | 0.4 | 1.6 |

In vivo activity

The in vivo activity of Bu-1880 was tested on mice against three experimental infections. The test pathogens were S. aureus Smith, E. coli Juhl and Ps. aeruginosa D15 using an intraperitoneal infection dose of 100 × $LD_{50}$. The antibiotic was subcutaneously administered immediately after the bacterial challenge. As shown in Table 5, Bu-1880 showed in vivo activity against all of the bacterial infections. Colistin showed much higher in vivo activity than Bu-1880 against the gram-negative pathogens, but was ineffective against the staphylococcal infection.

Table 5

| Test Organism | In vivo Activity $CD_{50}$ (mg./kg.) | |
|---|---|---|
| | Bu-1880 | Colistin |
| E. coli Juhl | 165 | 3.4 |
| Ps. aeruginosa D15 | 100 | 15 |
| S. aureus Smith | 80 | * |

*No protection at non-toxic dose (25 mg./kg.).

Toxicity

The acute toxicity of Bu-1880 (hydrochloride salt) was determined in mice. The subcutaneous and intravenous $LD_{50}$ were 300 mg./kg. and 37 mg./kg., respectively. In a comparative test, colistin hydrochloride showed the subcutaneous and intravenous $LD_{50}$ of 56 mg./kg. and 11 mg./kg., respectively.

Antibiotic Bu-1880 resembles to colistins[1], polymyxins[2] and circulins[3] in that they are all bacterial peptide antibiotics containing in the structure a fatty acid moiety[4] and 5 to 6 moles of α, γ-diaminobutyric acid[5]. However, Bu-1880 is different from the others in the lack of threonine in the molecule and the presence of new fatty acid moiety, 3-hydroxy-8-methyldecanoic acid, which to our knowledge is the first occurrence in natural products.

The antibacterial spectra of the bacterial peptide antibiotics are generally limited to either gram-negative or gram-positive. The colistin-polymyxin-circulin group of antibiotics are mainly active against gram-negative bacteria, and gramicidin-bacitracin groups are primarily active against gram-positive organisms. Bu-1880 is therefore different from these known antibiotics in its broader antibacterial spectrum.

the bowel. Both aerobic and anaerobic flora which are suseptible to Bu-1880 is reduced in the large intestine. When accompanied by adequate mechanical cleansing, they are useful in preparing for colonic surgery.

Bu-1880 is effective in the treatment of systemic bacterial infections when administered parenterally in the dosage range of about 250 mg. to about 3000 mg. per day in divided doses three or four times a day. Generally it is effective when administered at a dosage of about 5.0 to 7.5 mg./kg. of body weight every 12 hours.

A preferred embodiment of the present invention is the process for the preparation of the antibiotic Bu-1880, a basic peptide comprised of phenylalanine, leucine and α, γ-diaminobutyric acid in an approximate molar ratio of 1:2:5 and 3-hydroxy-8-methyldecanoic acid, having the infrared spectrum of FIG. 1 and the following physical characteristics: pKa of 8.83 in aqueous ethanol, m.p. of 239°–242° C. with decomposition, $[\alpha]_D^{24} = -18°$ (c. 1.0, N/10 HCl) and an elemental analysis of C, 56.34; H, 8.51; N, 15.92, and a molecular weight of about 1050±50; which process comprises aerobically fermenting Bacillus circulans A.T.C.C. 21828 and recovering the antibiotic by extraction.

A most preferred embodiment is the antibiotic Bu-1880, a basic peptide comprised of phenylalanine, leucine and α, γ-diaminobutyric acid in an approximate molar ratio of 1:2:5 and 3-hydroxy-8-methyldecanoic acid, having the infrared spectrum of FIG. 1 and the following physical characteristics: pKa of 8.83 in aqueous ethanol, m.p. of 239°–242° C. with decomposition, $[\alpha]_D^{24} = -18°$ (c. 1.0, N/10 HCl), an elemental analysis of C, 56.34; H, 8.51; N, 15.92; and a molecular weight of 1050±50.

We claim:

1. The antibiotic Bu-1880, a basic peptide comprised of phenylalanine, leucine, α, γ-diaminobutyric acid and 3-hydroxy-8-methyldecanoic acid in an approximate molar ratio of 1:2:5:1, having the infrared spectrum of FIG. 1 and the following physical characteristics: pKa of 8.83 in aqueous ethanol, m.p. of 239°–242° C. with decomposition, $[\alpha]_D^{24} = -18°$ (c. 1.0, N/10 HCl), an elemental analysis of C, 56.34; H, 8.51; N, 15.92, and a molecular weight of about 1050±50.

2. The process for the preparation of the antibiotic Bu-1880, a basic peptide comprised of phenylalanine, leucine, α, γ-diaminobutyric acid and 3-hydroxy-8-methyldecanoic acid in an approximate molar ratio of 1:2:5:1, having the infrared spectrum of FIG. 1 and the following physical characteristics: pKa of 8.83 in aqueous ethanol, m.p. of 239°–242° C. with decomposition, $[\alpha]_D^{24}=-18°$ (c. 1.0, N/10 HCl), an elemental analysis of C, 56.34; H, 8.51; N, 15.92, and a molecular weight of about 1050±50; which process comprises aerobically fermenting Bacillus circulans A.T.C.C. 21828 in a carbohydrate-proteinrich media for a period of about two to about three days, at a pH of about 8 to about 8.5, at a temperature of about 28° C., and then recovering the antibiotic by extraction with n-butanol.

* * * * *